(12) United States Patent
Booker

(10) Patent No.: US 8,244,630 B1
(45) Date of Patent: *Aug. 14, 2012

(54) PERFORMANCE BASED AUTO LOANS

(75) Inventor: Timothy Paul Booker, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,710

(22) Filed: Oct. 31, 2011

Related U.S. Application Data

(63) Continuation of application No. 12/843,592, filed on Jul. 26, 2010, now Pat. No. 8,051,002, which is a continuation of application No. 11/321,969, filed on Dec. 29, 2005, now Pat. No. 7,769,683.

(51) Int. Cl.
*G06Q 40/00* (2006.01)
(52) U.S. Cl. .............................. 705/38; 705/39
(58) Field of Classification Search .............. 705/35–40
See application file for complete search history.

(56) References Cited

U.S. PATENT DOCUMENTS

| | | | |
|---|---|---|---|
| 5,742,775 A | 4/1998 | King | |
| 6,148,293 A * | 11/2000 | King | 705/35 |
| 7,769,683 B1 | 8/2010 | Booker | |
| 7,774,277 B1 | 8/2010 | Booker | |
| 7,783,548 B1 | 8/2010 | Booker | |
| 8,051,002 B1 * | 11/2011 | Booker | 705/38 |
| 2005/0192898 A1 | 9/2005 | Hache | |
| 2006/0015422 A1 | 1/2006 | Dion | |
| 2006/0031158 A1 | 2/2006 | Orman | |
| 2006/0122932 A1 * | 6/2006 | Birtwell et al. | 705/40 |
| 2007/0083459 A1 | 4/2007 | Eubanks | |

OTHER PUBLICATIONS

U.S. Appl. No. 11/321,969, Final Office Action mailed Nov. 24, 2008, 7 pgs.
U.S. Appl. No. 11/321,969, Non Final Office Action mailed Mar. 20, 2009, 8 pgs.
U.S. Appl. No. 11/321,969, Non Final Office Action mailed Mar. 25, 2008, 8 pgs.
U.S. Appl. No. 11/321,969, Notice of Allowance mailed Mar. 29, 2010, 7 pgs.
U.S. Appl. No. 11/321,969, Notice of Allowance mailed Nov. 17, 2009, 6 pgs.
U.S. Appl. No. 11/321,969, Preliminary Amendment mailed Jun. 12, 2006, 3 pgs.
U.S. Appl. No. 11/321,969, Response filed Mar. 6, 2009 to Final Office Action mailed Nov. 24, 2008, 14 pgs.
U.S. Appl. No. 11/321,969, Response filed Jun. 22, 2009 to Non Final Office Action mailed Mar. 20, 2009, 16 pgs.
U.S. Appl. No. 11/321,969, Response filed Aug. 11, 2008 to Non Final Office Action mailed Mar. 25, 2008, 10 pgs.
U.S. Appl. No. 11/413,552, Final Office Action mailed Sep. 15, 2008, 9 pgs.
U.S. Appl. No. 11/413,552, Non Final Office Action mailed Feb. 14, 2008, 8 pgs.
U.S. Appl. No. 11/413,552, Non Final Office Action mailed Mar. 18, 2009, 6 pgs.

(Continued)

*Primary Examiner* — Thu Thao Havan
(74) *Attorney, Agent, or Firm* — Schwegman, Lundberg & Woessner, P.A.

(57) ABSTRACT

Disclosed are systems and methods for providing a loan having an interest rate and a loan period. The systems and methods dynamically adjust the interest rate during the loan period based on actual payment performance of a borrower, thereby resulting in an improved reward structure, greater borrower loyalty and an improved experience for the borrower.

21 Claims, 4 Drawing Sheets

OTHER PUBLICATIONS

U.S. Appl. No. 11/413,552, Non Final Office Action mailed Sep. 7, 2007, 6 pgs.
U.S. Appl. No. 11/413,552, Notice of Allowance mailed Mar. 26, 2010, 7 pgs.
U.S. Appl. No. 11/413,552, Notice of Allowance mailed Nov. 18, 2009, 6 pgs.
U.S. Appl. No. 11/413,552, Preliminary Amendment filed Dec. 12, 2008, 10 pgs.
U.S. Appl. No. 11/413,552, Response filed May 13, 2008 to Non Final Office Action mailed Feb. 14, 2008, 9 pgs.
U.S. Appl. No. 11/413,552, Response filed Jul. 20, 2009 to Non Final Office Action mailed Mar. 18, 2009, 14 pgs.
U.S. Appl. No. 11/413,552, Response filed Dec. 4, 2007 to Non Final Office Action mailed Sep. 7, 2007, 10 pgs.
U.S. Appl. No. 11/413,908, Final Office Action mailed Nov. 24, 2008, 7 pgs.
U.S. Appl. No. 11/413,908, Non Final Office Action mailed Mar. 18, 2008, 8 pgs.
U.S. Appl. No. 11/413,908, Non Final Office Action mailed Mar. 20, 2009, 6 pgs.
U.S. Appl. No. 11/413,908, Non Final Office Action mailed Sep. 7, 2007, 6 pgs.
U.S. Appl. No. 11/413,908, Non Final Office Action mailed Oct. 9, 2009, 6 pgs.
U.S. Appl. No. 11/413,908, Notice of Allowance mailed Apr. 20, 2010, 6 pgs.
U.S. Appl. No. 11/413,908, Response filed Jan. 11, 2010 to Non Final Office Action mailed Oct. 9, 2009, 11 pgs.
U.S. Appl. No. 11/413,908, Response filed Mar. 6, 2009 to Final Office Action mailed Nov. 24, 2008, 15 pgs.
U.S. Appl. No. 11/413,908, Response filed Jun. 22, 2009 to Non Final Office Action mailed Mar. 20, 2009, 14 pgs.
U.S. Appl. No. 11/413,908, Response filed Aug. 18, 2008 to Non Final Office Action mailed Mar. 18, 2008, 10 pgs.
U.S. Appl. No. 11/413,908, Response filed Dec. 4, 2007 to Non Final Office Action mailed Sep. 7, 2007, 9 pgs.
U.S. Appl. No. 12/843,592, Final Office Action mailed Apr. 7, 2011, 6 pgs.
U.S. Appl. No. 12/843,592, Non-Final Office Action mailed Oct. 4, 2010, 9 pgs.
U.S. Appl. No. 12/843,592, Notice of Allowance mailed Jul. 14, 2011, 8 pgs.
U.S. Appl. No. 12/843,592, Preliminary Amendment filed Jul. 26, 2010, 4 pgs.
U.S. Appl. No. 12/843,592, Response filed May 27, 2011 to Final Office Action mailed Apr. 7, 2011, 8 pgs
U.S. Appl. No. 12/843,592, Response filed Feb. 4, 2011 to Non Final Office Action mailed Oct. 4, 2010, 9 pgs.
"FTC Facts for Consumers—Credit Scoring", Federal Trade Commission for the Consumer, (Aug. 2005), 6 pgs.

* cited by examiner

PERFORMANCE BASED AUTO LOANS

CROSS REFERENCE TO RELATED APPLICATIONS

This application is a continuation of and claims the benefit of priority under 35 U.S.C. §120 to U.S. patent application Ser. No. 12/843,592, filed Jul. 26, 2010, which is a continuation of and claims the benefit of priority under 35 U.S.C. §120 to U.S. patent application Ser. No. 11/321,969, filed Dec. 29, 2005, the disclosures of each of which are incorporated herein by reference in their entirety.

TECHNICAL FIELD

Various embodiments of the present disclosure pertain to information handling systems used in finance and banking applications and more particularly, to providing consumer lending products and services that offer an improved customer experience.

BACKGROUND

With interest rates at historic lows, consumer borrowing has been steadily growing. Consumers have been borrowing money from financial lending institutions for everything ranging from automobiles, to dream vacations, and multi-million dollar homes. A consumer may typically apply for a loan via the Internet, and often within minutes obtain an approval for the loan. One or more financial lending institutions may compete on-line by providing attractive upfront incentives for the loan. Most financial lending institutions decide on the loan application, virtually instantly, by primarily evaluating applicant's credit history as determined by their overall credit score. It is well known that the credit score is a numeric assessment made by independent credit reporting companies such as Equifax, Experian and TransUnion, which is used to evaluate the amount of 'financial risk' involved in a credit transaction.

Applicants having less than acceptable credit score are often classified as high risk borrowers, who often pay a higher interest rate over longer loan duration. A threshold for a minimum acceptable credit score may be determined by each financial lending institution. The practice of offering borrowers loans at rates that are higher than warranted by the credit history of the borrower is sometimes referred to as predatory lending. While past credit history and credit score may be a good indicator of future financial performance, an applicant having a less than acceptable credit score but desirous to improve the credit score may become a victim of predatory lending by being locked into paying the higher interest rate for the entire duration of the loan. Existing customers or members of a financial lending institution may have little or no incentive to maintain loyalty since other competing financial lending institutions are likely to offer seemingly lucrative upfront incentives to seek new customers for refinancing and/or loan transfers.

Accordingly, it would be desirable to provide a consumer loan having a built-in incentive structure to reward actual performance and maintain customer loyalty, absent the disadvantages found in the prior methods discussed above.

SUMMARY

Various embodiments of the present disclosure are directed to systems and methods for providing a loan having an interest rate and a loan period. The systems and methods dynamically adjust the interest rate during the loan period based on actual payment performance of a borrower, thereby resulting in an improved reward structure, greater borrower loyalty and an improved experience for the borrower.

In one aspect of the disclosure, the interest rate is dynamically adjusted during the loan period responsive to a change in a credit score of the borrower. The credit score may be derived internally by a financial lending institution and/or may be reported by an independent credit reporting company.

DETAILED DESCRIPTION

Figure 1A:
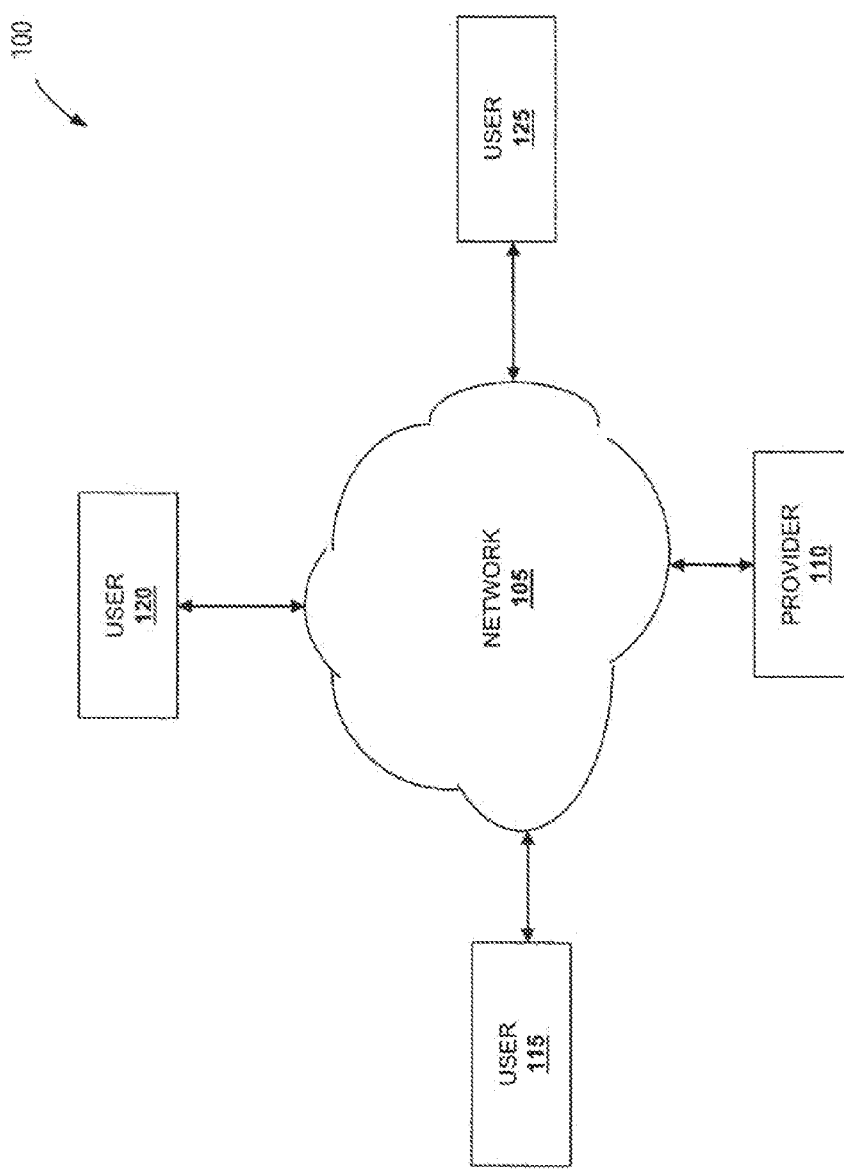
FIG. 1A is a block diagram illustrating an embodiment of a system.

Referring now to FIG. 1A, in one embodiment, a system for financial lending 100 is illustrated. The system 100 includes a computer network 105 such as, for example, a Transport Control Protocol/Internet Protocol (TCP/IP) network (e.g., the Internet and/or an intranet). A financial lending institution or a provider 110 is operably coupled to the network 105. Examples of a provider 110 may include a bank, a credit union, an insurance company, a financial investment company, a credit card issuer, a credit issuing division of a capital goods manufacturer, a broker/agent, and similar others. A plurality of users 115, 120, and 125 are also operably coupled to the network 105 in order to allow communication between the users 115, 120, and 125 and the provider 110. Examples of a user may include a borrower, a member of a financial lending institution, a credit counselor, a broker/agent, a potential buyer of a new loan, a researcher, and similar others.

In a particular embodiment, the system 100 is operable to process financial transactions between various entities such as between the provider 110 and the user 115. A financial transaction generally involves a change in the status of the financial resources of two or more entities, such as businesses and/or individuals. For example, the user 115 may initiate a loan transaction by completing an on-line loan application at the provider's web site. After collecting loan application information from the user 115, the provider 115 may look up a credit score rating for the user 115 and determine whether to approve or disapprove the loan application submitted by the user 115. On approval and signing of a loan agreement using secure digital signatures, the provider 110 may electronically transfer the loan amount to a bank account of the user 115. The user 115 may electronically transfer funds out of a specified bank account to the provider 110 as monthly payments.

Each of the provider 110 and the users 115, 120, and 125 includes a respective network interface for communicating with the network 105 (e.g., outputting information to, and receiving information from, the network 105), such as by transferring information (e.g., instructions, data, signals) between such users and the network 105. Accordingly, through the network 105, the provider 110 communicates with the users 115, 120, and 125, and the users 115, 120, and 125 communicate with the provider 110.

For clarity, FIG. 1A depicts only one provider 110. However, the system 100 may include a plurality of providers. Likewise, for clarity, FIG. 1A depicts only three users 115, 120, and 125. However, the system 100 may include a plurality of users. In the discussion below, the user 115 is a representative one of the users 115, 120, and 125.

Each of the provider 110, and the users 115, 120, and 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1A, such IHS's may be coupled to each other. Accordingly, the provider 110 and the users 115, 120, and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an HS also include a router, a switch and other devices coupled to a network (e.g. the network 105).

Figure 1B:
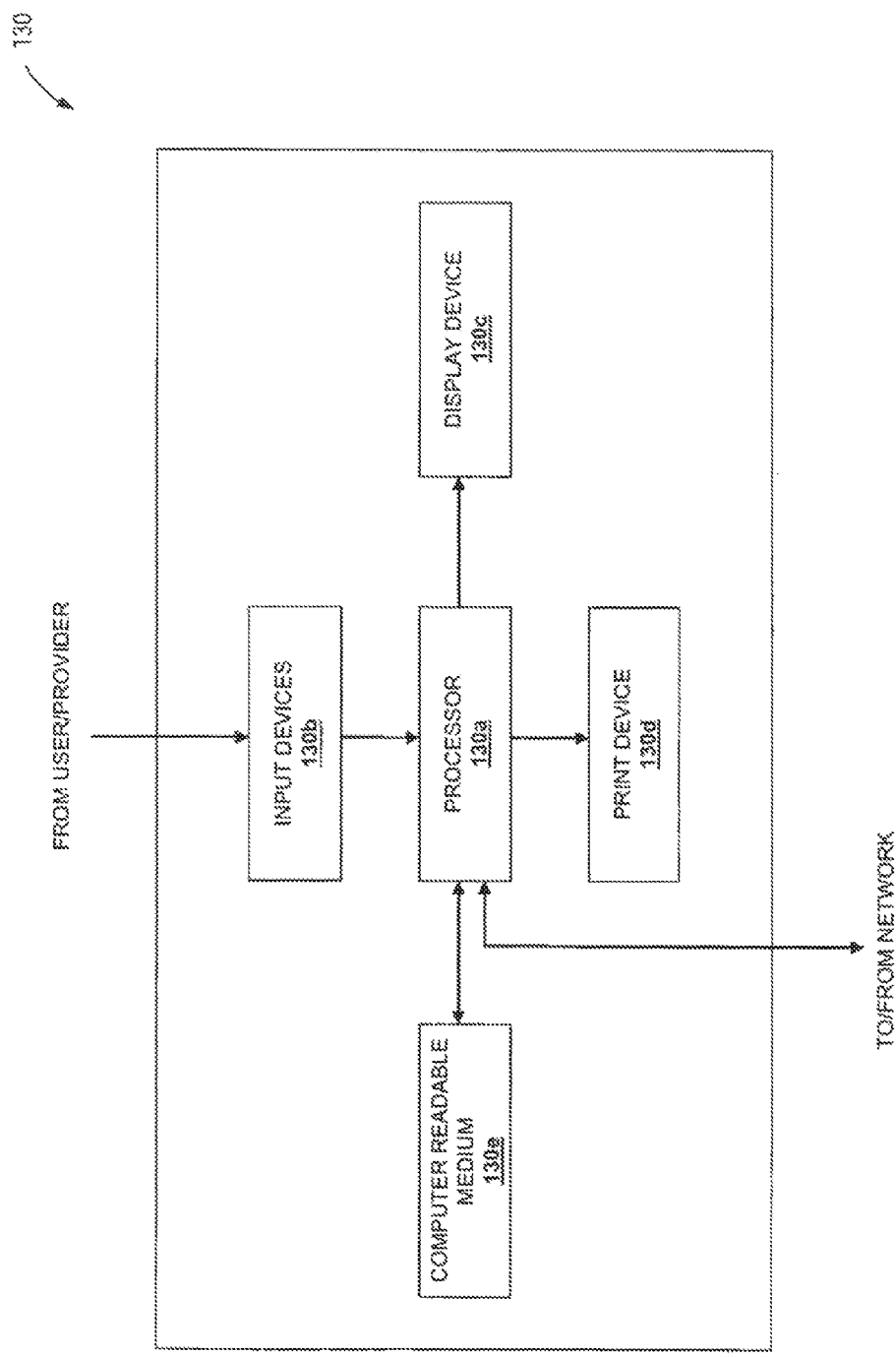
FIG. 1B is a block diagram illustrating an embodiment of a representative information handling system used in the system of FIG. 1A.

Referring now to FIG. 1B, an IHS 130 which is representative of one of the IHS's described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), (e) a computer readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer readable medium 130e, as illustrated in FIG. 1B.

For example, in response to signals from the processor 130a, the display device 130c displays, visual images. Information may be input to the processor 130a from the input devices 130b, and the processor 130a may receive such information from the input devices 130b. Also, in response to signals from the processor 130a, the print device 130d prints visual images on paper.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

In an exemplary, non-depicted embodiment, the IHS 130 includes an operating system (OS). The OS is a type of software program that controls execution of other software programs, referred to as application software programs. Each software program includes a plurality of instructions executable by the processor 130a. In various embodiments the instructions and/or software programs may be implemented in various ways, including procedure-based techniques, component-based techniques, and/or object-oriented techniques, among others. Examples include assembler, C, XML, C++ objects, Java and Microsoft's .NET technology.

The computer readable medium 130e and the processor 130a are structurally and functionally interrelated with one another as described below in further detail. Each IHS of the illustrative embodiment is structurally and functionally interrelated with a respective computer readable medium, similar to the manner in which the processor 130a is structurally and functionally interrelated with the computer readable medium 130e. In that regard, the computer readable medium 130e is a representative one of such computer readable media including, for example, but not limited to, a hard disk drive.

The computer readable medium 130e stores (e.g., encodes, records, or embodies) functional descriptive material (e.g., including but not limited to software (also referred to as computer programs or applications) or data structures). Such functional descriptive material imparts functionality when encoded on the computer readable medium 130e. Also, such functional descriptive material is structurally and functionally interrelated to the computer readable medium 130e.

With such functional descriptive material, data structures define structural and functional interrelationships between such data structures and the computer readable medium 130e (and other aspects of the system 100). Such interrelationships permit the data structures functionality to be realized. Also, within such functional descriptive material, computer programs define structural and functional interrelationships between such computer programs and the computer readable medium 130e (and other aspects of the system 100). Such interrelationships permit the computer programs' functionality to be realized.

For example, the processor 130a reads (e.g., accesses or copies) such functional descriptive material from the computer readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer readable medium) for causing the processor 130a to perform additional operations (as described elsewhere herein). Accordingly, such functional descriptive material exhibits a functional interrelationship with the way in which processor 130a executes its processes and performs its operations.

Further, the computer readable medium 130e is an apparatus from which the computer application is accessible by the processor 130a, and the computer application is processable by the processor 130a for causing the processor 130a to perform such additional operations. In addition to reading such functional descriptive material from the computer readable medium 130e, the processor 130a is capable of reading such functional descriptive material from (or through) the network 105 which is also a computer readable medium (or apparatus). Moreover, the memory device of the IHS 130 is itself a computer readable medium (or apparatus).

Figure 2:
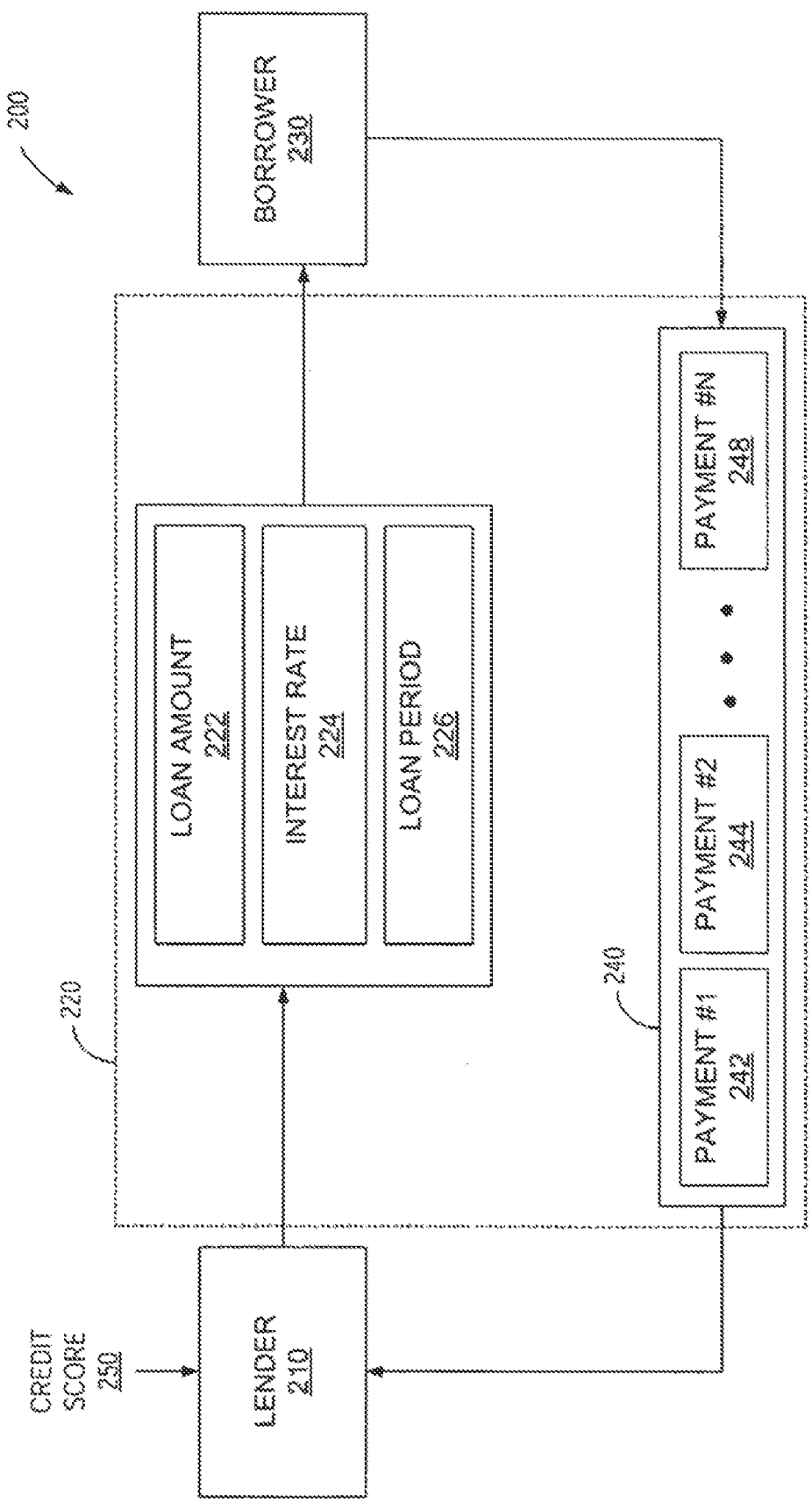
FIG. 2 is a block diagram illustrating a loan transaction system, according to an embodiment.

FIG. 2 is a block diagram illustrating a loan transaction processing system 200, according to an embodiment. In the depicted embodiment, the transaction system 200 includes a lender 210 such as a financial lending institution having financial resources to provide a loan 220 to a borrower 230. In an exemplary, non-depicted embodiment, the system 200 may include a plurality of lenders and borrowers. In a particular embodiment, the lender 210 is substantially the same as the provider 110 and the borrower 230 is substantially the same as the user 115 described with reference to FIG. 1A. In this embodiment, the lender 210 is coupled to the borrower 230 via the network 105. At least a portion of the financial transactions between the lender 210 and the borrower 230 such as the loan 220 take place electronically via the network 105.

In a particular embodiment, the loan 220 is at least one of an automobile loan, a personal loan, a home equity loan, a loan on a credit card, an educational loan and/or a combination thereof. The loan 220 may be set up as an explicit or an implicit agreement between the lender 210 and the borrower 230. In a loan transaction, in response to a request for a loan by the borrower 230, an advance of funds known as a loan amount 222 (or a principal amount) is transferred from the lender 210 to the borrower 230. As a part of the agreement, the borrower 230 agrees to pay back the lender 210, the loan amount 222 with interest over an agreed upon time period. An agreed upon interest rate 224 for the loan 220 and an agreed upon loan period 226 define a monthly or periodic payment amount. That is, the borrower 230 pays back the loan 220 over the loan period 226 by making a plurality of payments 240 on or before a series of predefined dates and/or time periods, where each of the plurality of payments 240 shown as payment #1 242, payment #2 244 and payment #n 248 include a principal portion and an interest portion.

In the depicted embodiment, the lender 210 initially sets the interest rate 224 for the loan 220 in response to receiving a credit score 250 for the borrower 230. In a particular embodiment, the borrower 230 is a high risk borrower having the credit score 250 below a predefined threshold. The lender 210 may define a particular value for the credit score 250 as a minimum threshold. To cover the higher risks associated with the high risk borrower, the lender 210 increases the interest rate 224 and/or increases the loan period 226. In a particular embodiment, the credit score 250 is received from a third party, independent credit reporting/monitoring bureau such as Equifax, Experian and TransUnion companies. In another embodiment, the credit score 250 may be derived internally by the lender 210 based on information provided by an existing member and/or borrower.

In a particular embodiment, the interest rate 224 is adjustable by the lender 210 in response to the borrower's desirable financial conduct such as a payment performance of the borrower 230 measured over an adjustable time period such as 12 months. During the adjustable time period, the borrower 230 pays at least n number of the plurality of payments 240, where n is the adjustable time period. In a particular embodiment, the adjustable time period n is adjustable from at least 6 months up to a maximum period not exceeding the loan period 226. The lender 210 monitors payments received over the adjustable time period for on time performance. If each payment included in the plurality of payments 240 is received in a timely manner during the adjustable time period, then the lender 210 dynamically adjusts the interest rate 224 to reward the borrower's performance. In a particular embodiment, the interest rate 224 is adjustable after the expiration of the adjustable time period by reducing the interest rate 224 by a predefined amount. The reduction in the interest rate 224 may result in reducing the loan period 226 while maintaining the same payment amount.

In an embodiment, the lender 210 may adjust the interest rate 224 multiple times during the loan period 226 by defining multiple adjustable time periods for evaluating payment performance. For example, the lender 210 may adjust the interest rate 224 every 12 months during a 60 month loan period based on payment performance.

By providing an ability to lower the interest rate 224 during the loan period 226 the lender 210 provides an incentive to the borrower 230 to maintain loyalty. In a particular embodiment, the interest rate 224 is adjustable during the loan period 226 responsive to a change in the credit score 250 of the borrower 230. That is, in addition to rewarding the borrowers desirable financial conduct as measured by the timely payment performance of the borrower 230, the lender 210 may further reduce the interest rate 224 in response to an increase in the credit score 250 of the borrower 230. Also, it should be appreciated that an adjustment to the loan 220 may be made on any number of borrower 230 activities, including for example timeliness on other accounts, minimum balance, or other good financial conduct.

In an embodiment, the adjustment to the interest rate 224 during the loan period 226 may be expressed as a predefined function of the borrower's performance as measured by parameters such as number of consecutive payments paid on a timely basis and an increase in the credit score 250 compared to the threshold and similar others.

Figure 3:
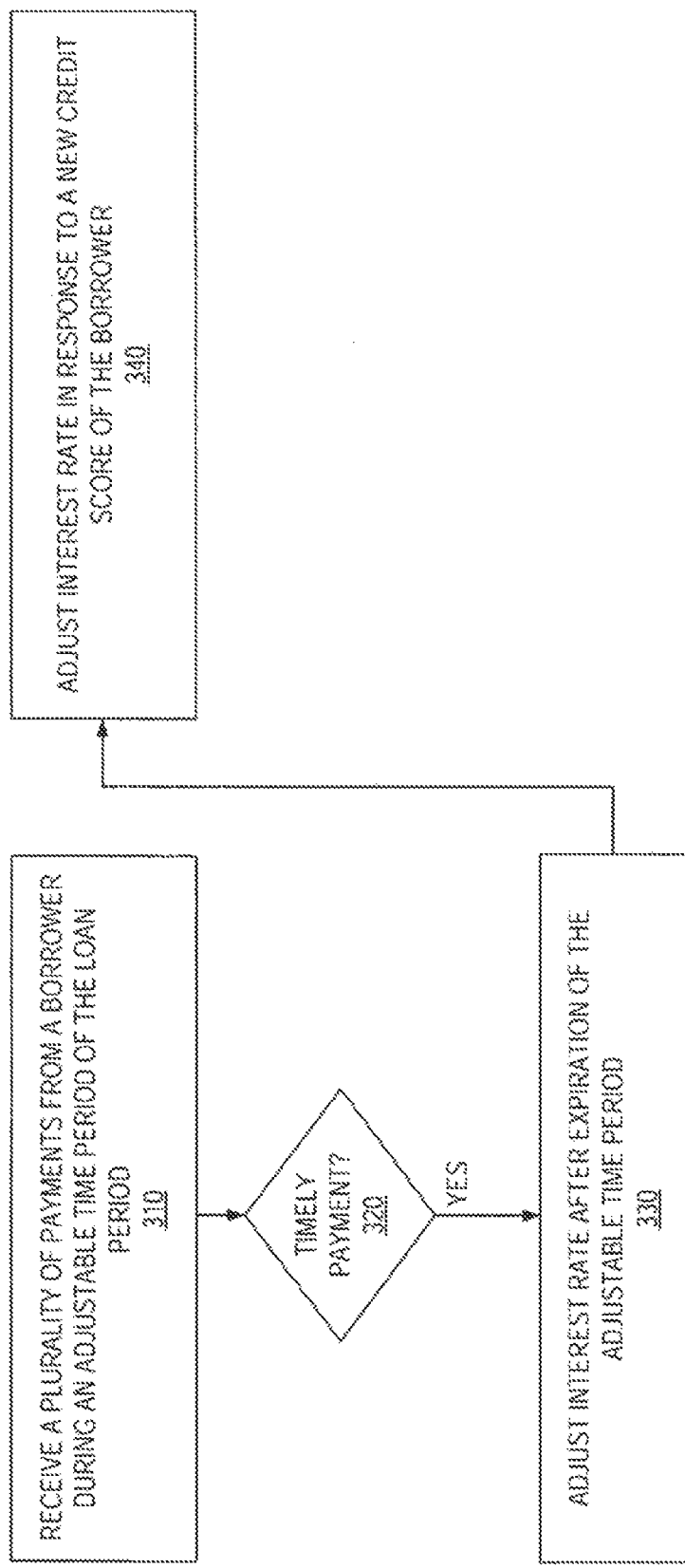
FIG. 3 is a flow chart illustrating a method for providing a loan having an interest rate and a loan period, according to an embodiment.

FIG. 3 is a flow chart illustrating a method for providing a loan having an interest rate and a loan period, according to an embodiment. In a particular embodiment, the loan is substantially the same as the loan 220 described with reference to FIG. 2. In an embodiment, the method for providing the loan is implemented using the system 100 and the computer readable medium 130*e* described with reference to FIGS. 1A and 1B.

In step 310, a plurality of payments are received from a borrower during an adjustable time period of the loan period. As described earlier, in a particular embodiment, the adjustable time period is adjustable from at least 6 months up to a maximum period not exceeding the loan period. In step 320, a determination is made whether each one of the plurality of payments is received in a timely manner, e.g., on or before a predefined due date. In step 330, in response to determining that the plurality of payments received during the adjustable time period are received in a timely manner, the interest rate is adjusted after the expiration of the adjustable time period.

Various steps described above may be added, omitted, combined, altered, or performed in different orders. For example, in a particular embodiment, the step 340 may be added to further adjust the interest rate. In step 340, the interest rate is adjusted in response to receiving a new value for the credit score of the borrower.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware, software and methods illustrated herein may vary depending on the implementation. For example, it should be understood that while the various incentives describe a reduction in interest rate, it would be within the spirit and scope of the invention to encompass an embodiment deploying other forms of incentives such as membership reward points, e.g., points that may be redeemable to purchase merchandise or airline tickets, and/or membership fee waivers to reward payment performance during the loan period.

The methods and systems described herein provide for an adaptable implementation. Although certain embodiments have been described using specific examples, it will be apparent to those skilled in the art that the invention is not limited to these few examples. The benefits, advantages, solutions to problems, and any element(s) that may cause any benefit, advantage, or solution to occur or become more pronounced are not to be construed as a critical, required, or an essential feature or element of the present disclosure.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for servicing a loan, the system comprising at least one subsystem operating on a machine for:
   receiving a plurality of first payments from a borrower of a loan according to the initial interest rate, wherein the loan comprises a loan period and an initial interest rate, and wherein the plurality of first payments are received during a first time period of the loan period;
   adjusting the initial interest rate of the loan to a second interest rate after the first time period, in response to the plurality of first payments received during the first time period; and
   receiving at least one second payment from the borrower for the loan according to the second interest rate.

2. The system of claim 1, wherein the at least one subsystem operating on the machine:
   monitors a credit score of the borrower;
   determines that the credit score has changed; and
   adjusts the initial interest rate of the loan to the second interest rate in response to the change in credit score.

3. The system of claim 2, wherein the second interest rate is lower than the initial interest rate.

4. The system of claim 2, wherein the at least one subsystem operating on the machine:
   adjusts the second interest rate to a third interest rate in response to a subsequent change in the credit score.

5. The system of claim 1, wherein the system adjusting the initial interest rate of the loan to the second interest rate after the first time period results in the borrower making a lower periodic payment or reduces the loan period.

6. The system of claim 1, wherein the system adjusting the initial interest rate of the loan to the second interest rate after the first time period is in response to the plurality of first payments being received on time during the first time period.

7. The system of claim 1, wherein the second interest rate is lower than the initial interest rate.

8. A computer-readable medium comprising computer-readable instructions for providing a loan, said computer-readable instructions comprising instructions for:
   receiving a plurality of first payments from a borrower of a loan according to the initial interest rate, wherein the loan comprises a loan period and an initial interest rate, and wherein the plurality of first payments are received during a first time period of the loan period;
   adjusting the initial interest rate of the loan to a second interest rate after the first time period, in response to the plurality of first payments received during the first time period; and
   receiving at least one second payment from the borrower for the loan according to the second interest rate.

9. The computer-readable medium of claim 8, further comprising computer-readable instructions comprising instructions for:
   monitoring a credit score of the borrower;
   determining that the credit score has changed; and
   adjusting the initial interest rate of the loan to the second interest rate in response to the change in credit score.

10. The computer-readable medium of claim 9, wherein the second interest rate is lower than the initial interest rate.

11. The computer-readable medium of claim 9, further comprising computer-readable instructions comprising instructions for:
    adjusting the second interest rate to a third interest rate in response to a subsequent change in the credit score.

12. The computer-readable medium of claim 8, wherein the computer-readable instructions for adjusting the initial interest rate of the loan to the second interest rate after the first time period results in the borrower making a lower periodic payment or reduces the loan period.

13. The computer-readable medium of claim 8, wherein the computer-readable instructions for adjusting the initial interest rate of the loan to the second interest rate after the first time period is in response to the plurality of first payments being received on time during the first time period.

14. The computer-readable medium of claim 8, wherein the second interest rate is lower than the initial interest rate.

15. A method comprising:
    receiving, at the electronic information handling system, a plurality of first payments from a borrower of a loan according to the initial interest rate, wherein the loan comprises a loan period and an initial interest rate, and wherein the plurality of first payments are received during a first time period of the loan period;
    adjusting, at the electronic information handling system, the initial interest rate of the loan to a second interest rate after the first time period, in response to the plurality of first payments received during the first time period; and
    receiving, at the electronic information handling system, at least one second payment from the borrower for the loan according to the second interest rate.

16. The method of claim 15, further comprising:
    monitoring a credit score of the borrower;
    determining that the credit score has changed; and
    adjusting the initial interest rate of the loan to the second interest rate in response to the change in credit score.

17. The method of claim 16, wherein the second interest rate is lower than the initial interest rate.

18. The method of claim 16, further comprising:
    adjusting the second interest rate to a third interest rate in response to a subsequent change in the credit score.

19. The method of claim 15, wherein adjusting the initial interest rate of the loan to the second interest rate after the first time period results in the borrower making a lower periodic payment or reduces the loan period.

20. The method of claim 15, wherein adjusting the initial interest rate of the loan to the second interest rate after the first time period is in response to the plurality of first payments being received on time during the first time period.

21. The method of claim 16, wherein the second interest rate is lower than the initial interest rate.

* * * * *